United States Patent
Wang

(10) Patent No.: US 10,602,060 B2
(45) Date of Patent: Mar. 24, 2020

(54) CAMERA AND INTEGRATED CIRCUIT BOARD

(71) Applicant: Hangzhou Hikvision Digital Technology Co., Ltd., Zhejiang (CN)

(72) Inventor: Xiaojiang Wang, Zhejiang (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 15/746,051

(22) PCT Filed: May 12, 2016

(86) PCT No.: PCT/CN2016/081830
§ 371 (c)(1),
(2) Date: Jan. 19, 2018

(87) PCT Pub. No.: WO2017/012396
PCT Pub. Date: Jan. 26, 2017

(65) Prior Publication Data
US 2018/0220069 A1 Aug. 2, 2018

(30) Foreign Application Priority Data
Jul. 21, 2015 (CN) .................... 2015 2 0530956 U

(51) Int. Cl.
*H04N 5/232* (2006.01)
*H04N 5/225* (2006.01)
(Continued)

(52) U.S. Cl.
CPC ......... *H04N 5/23238* (2013.01); *H04N 5/225* (2013.01); *H04N 5/2253* (2013.01); *H04N 5/265* (2013.01); *H04N 7/18* (2013.01)

(58) Field of Classification Search
CPC ...... H04N 7/18; H04N 5/23238; H04N 5/225; H04N 5/2253; H04N 5/265
See application file for complete search history.

(56) References Cited

U.S. PATENT DOCUMENTS

| | | | |
|---|---|---|---|
| 2007/0081091 A1* | 4/2007 | Pan ................... | A61B 1/00165 348/335 |
| 2007/0126863 A1 | 7/2007 | Prechtl et al. | |

(Continued)

FOREIGN PATENT DOCUMENTS

| | | |
|---|---|---|
| CN | 101320048 A | 12/2008 |
| CN | 102137229 A | 7/2011 |

(Continued)

OTHER PUBLICATIONS

International Search Report dated Aug. 3, 2016, from International Application No. PCT/CN2016/081830, 6 pages.

(Continued)

*Primary Examiner* — Thai Q Tran
*Assistant Examiner* — Sunghyoun Park
(74) *Attorney, Agent, or Firm* — Meunier Carlin & Curfman LLC

(57) ABSTRACT

The present application discloses a camera and an integrated circuit board. The camera includes: an integrated circuit board and a plurality of image sensor boards, wherein an image sensor is mounted on each of the image sensor boards; the plurality of image sensor boards are configured for outputting acquired first image signals to the integrated circuit board; and the integrated circuit board is connected with the plurality of image sensor boards and configured for performing stitching and encoding processing on the first image signals. The present application solves the technical problem that it is difficult for camera equipment provided in the prior art to achieve panoramic shooting.

6 Claims, 3 Drawing Sheets

(51) Int. Cl.
*H04N 7/18* (2006.01)
*H04N 5/265* (2006.01)

(56) References Cited

U.S. PATENT DOCUMENTS

| | | | |
|---|---|---|---|
| 2008/0211915 A1* | 9/2008 | McCubbrey | G08B 13/19608 348/159 |
| 2009/0034540 A1* | 2/2009 | Law | H04L 12/462 370/400 |
| 2009/0290013 A1* | 11/2009 | Hayashi | H04N 5/232 348/36 |
| 2010/0097443 A1* | 4/2010 | Lablans | G03B 37/00 348/36 |
| 2013/0119241 A1* | 5/2013 | Wallner | H04N 5/232 250/214 P |
| 2014/0248576 A1* | 9/2014 | Tchouprakov | A61B 1/253 433/30 |
| 2014/0266773 A1 | 9/2014 | Aguilar et al. | |
| 2015/0009350 A1 | 1/2015 | Sarwari et al. | |
| 2015/0228228 A1* | 8/2015 | Han | G09G 3/005 345/690 |
| 2015/0264232 A1* | 9/2015 | Yang | H04N 5/2254 348/373 |
| 2015/0296173 A1* | 10/2015 | Yin | H04N 7/015 348/472 |

FOREIGN PATENT DOCUMENTS

| | | |
|---|---|---|
| CN | 102546338 A | 7/2012 |
| CN | 103179401 A | 6/2013 |
| CN | 104202558 A | 12/2014 |
| CN | 204993576 U | 1/2016 |

OTHER PUBLICATIONS

Supplementary European Search Report dated Nov. 12, 2018, from related EP application No. 16827087.4, 10 pages.

* cited by examiner

CAMERA AND INTEGRATED CIRCUIT BOARD

The present application is a 371 of International Application Number PCT/CN2016/081830, filed May 12, 2016, which claims priority to Chinese patent application No. 201520530956.2 filed with the State Intellectual Property Office of People's Republic of China on Jul. 21, 2015 and entitled "Camera and Integrated Circuit Board", each of which are incorporated herein by reference in their entirety.

TECHNICAL FIELD

The application relates to the field of video monitoring, in particular to a camera and an integrated circuit board.

BACKGROUND

A camera is an important component for a monitoring system. Due to limitations of the lens shooting angle, the common single-lens cameras available from the market can only shoot scenes from relatively small angles. Due to the shooting angle of the camera, pictures can only be taken at a small angle, with a small view angle and more blind spots, and thus it is unable to meet the needs of large-scale outdoor monitoring, such as monitoring of large roads, bridges, squares, roofs, or the like.

In the prior art, a video monitoring camera includes an image sensor for acquiring images, an image processor for encoding and performing analog-to-digital conversion on the images acquired by the image sensors, communication transmission lines and power transmission lines. Some video monitoring cameras further include a server for performing post-processing and integration on the images encoded by video monitoring cameras, so that the pictures shot are presented with a certain angle and quality when being displayed in a back-end.

Multi-lens panoramic cameras can avoid the drawbacks of single-lens cameras in monitoring. A conventional video monitoring camera can only receive images from one image sensor, and its monitoring range is generally less than 150 degrees of a view angle. In order to achieve monitoring within 180 degrees in horizontal, it is necessary to place additional monitoring cameras to coverage a greater view angle and to stitch images acquired by a plurality of cameras by a server, which results in high equipment costs. For the case that images acquired by a plurality of cameras are stitched into one image, the cameras should be placed strictly in a certain angle according to standards, otherwise it will seriously affect the effect of stitching, which increases the difficulty in installation and testing on site.

No effective solution has been proposed so far to solve the above problem.

SUMMARY

Embodiments of the present application provide a camera and an integrated circuit board, in order to at least solve the technical problem that it is difficult for camera equipment provided in the prior art to achieve panoramic shooting.

In one aspect, the embodiments of the present application provide a camera, which includes: an integrated circuit board and a plurality of image sensor boards, wherein each of the image sensor boards has an image sensor mounted thereon; the plurality of image sensor boards are configured for outputting acquired first image signals to the integrated circuit board; and the integrated circuit board is connected with the plurality of image sensor boards and configured for performing stitching and encoding processing on the first image signals.

Further, the integrated circuit board includes: an image stitching component configured for outputting second image signals, which are obtained by performing stitching processing on the first image signals, to an image encoding component; and the image encoding component connected with the image stitching component and configured for outputting third image signals which are obtained by performing encoding processing on the second image signals.

Further, the image encoding component is further configured for sending a control signal to the image stitching component and/or reading a current operation state of the image stitching component via serial peripheral interfaces.

Further, the image stitching component is configured for outputting the second image signals to the image encoding component via at least one pair of differential clock signal lines and twelve pairs of differential data signal lines.

Further, the image stitching component is further configured for configuring the image sensor on each of the image sensor boards and/or reading a current operation state of the image sensor via serial peripheral interfaces.

Further, the camera further includes one or more storage components connected with the integrated circuit board and configured for storing the first image signals.

Further, the integrated circuit board is connected with the plurality of image sensor boards via flexible connecting lines.

Further, the shape of a photosensitive surface of an image sensor on each of the image sensor boards is a rectangle, short edges of the rectangle are parallel to the ground plane and long edges of the rectangle are perpendicular to the ground plane, and outer surfaces of the image sensors on the plurality of image sensor boards form a sector with a preset angle.

In another aspect, the embodiments of the present application further provide an integrated circuit board, which includes: an input port, connected with a plurality of image sensor boards and configured for receiving an image signal acquired by an image sensor mounted on each of the plurality of image sensor boards; a processor, connected with the input port and configured for performing stitching and encoding processing on the image signals; and an output port, connected with the processor and configured for outputting image signals subjected to the stitching and encoding processing.

Further, the input port is configured for receiving the image signals via a pair of differential clock signal lines and a plurality of pairs of differential data signal lines.

The embodiments of the present application provide a camera and an integrated circuit board included in the camera. The camera includes: an integrated circuit board, and a plurality of image sensor boards, each of the image sensor boards has an image sensor mounted thereon; the plurality of image sensor boards are configured for outputting acquired first image signals to the integrated circuit board; and the integrated circuit board is connected with the plurality of image sensor boards and configured for performing stitching and encoding processing on the first image signals. By performing stitching, encoding and outputting processing on the image signals acquired by the plurality of image sensor boards, the purpose for implementing panoramic shooting by using one camera and thereby the technical effect of performing panoramic shooting with simple operations and installation is achieved, and thus the technical problem that camera equipment provided by the prior art is difficult to perform panoramic shooting is solved.

BRIEF DESCRIPTION OF THE DRAWINGS

The drawings described herein are used to provide further understanding of the present application, and form a part of the present application. The schematic embodiments and description herein are used to explain the present application and do not constitute improper limitations to the present application. In the drawings.

Figure 1:
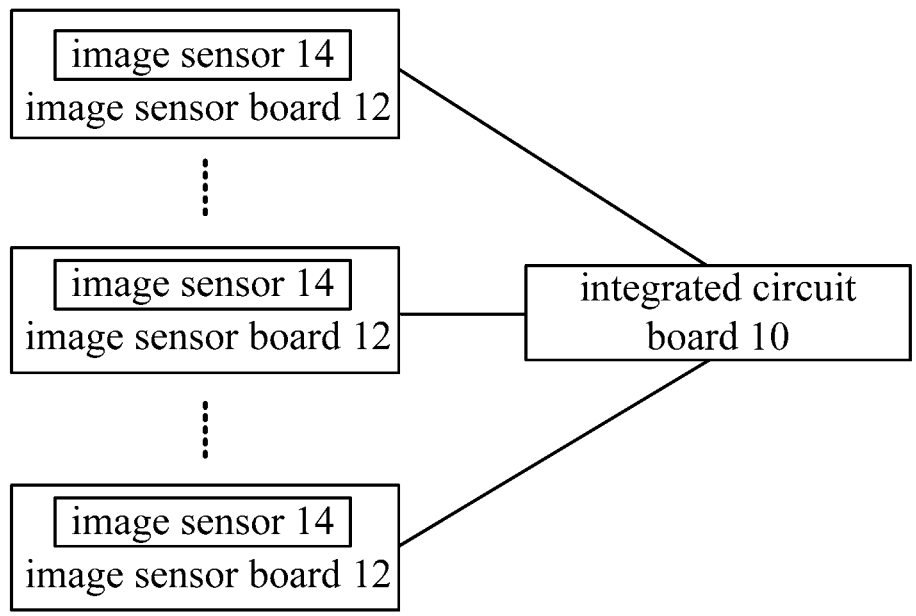
FIG. 1 is a structural block diagram of a camera according to an optional embodiment of the present application.

The reference signs in the drawings described above are provided as follows: 10. integrated circuit board; 12. image sensor board; 14. image sensor; 20. image stitching component; 22. image encoding component; 30. storage component; 40. input port; 42. processor; 44. output port.

DETAILED DESCRIPTION

In order to make those of ordinary skills in the art better understand the solution of the present application, the technical solution of the present application will be described in detail with reference to the drawings of embodiments of the present application. Obviously, the embodiments described are merely some of the embodiments of the present application, instead of all the embodiments. All other embodiments obtained by those of ordinary skills in the art based on the embodiments herein without any creative efforts should be within the scope of the present application.

It should be noted that the terms such as "first", "second" and the like in the description and claims of the present application and in the drawings described above are used to distinguish similar objects, and are not necessarily used to describe a specific order or sequence. It should be understood that the data used in this way are interchangeable under appropriate circumstances so that the embodiments of the present application described herein can be implemented in an order other than those illustrated or described herein. Moreover, the terms "include", "comprise" and "have" or any variants thereof are intended to cover non-exclusive inclusions. For example, processes, methods, systems, products or devices including a series of steps or elements include not only those steps or elements specifically listed but also those not specifically listed or intrinsic to such processes, methods, systems, products or devices.

A camera is provided according to an embodiment of the present application. It should be noted that steps shown in the flowcharts of the drawings can be performed in a computer system, such as a computer system that can execute a set of computer-executable instructions. Although a logical order is shown in a flowchart, in some cases, the steps shown or described can be performed in an order different from the logical order herein.

FIG. 1 is a structural block diagram of a camera according to an optional embodiment of the present application. As shown in FIG. 1, the camera can include: an integrated circuit board 10, and a plurality of image sensor boards 12, each of the a plurality of image sensor boards 12 has an image sensor 14 mounted thereon.

The image sensor boards 12 are configured for outputting acquired first image signals to the integrated circuit board 10.

The integrated circuit board 10 is connected with the plurality of image sensor boards 12 and configured for performing stitching and encoding processing on the first image signals.

In the embodiment of the present application, a camera is provided, which includes: an integrated circuit board, and a plurality of image sensor boards, each of the image sensor boards has an image sensor mounted thereon; the plurality of image sensor boards are configured for outputting acquired first image signals to the integrated circuit board; and the integrated circuit board is connected with the plurality of image sensor boards and configured for performing stitching and encoding processing on the first image signals. By performing stitching, encoding and outputting processing on the image signals acquired by the plurality of image sensor boards, the purpose for implementing panoramic shooting by using one camera and thereby the technical effect of performing panoramic shooting with simple operations and installation is achieved, and thus the technical problem that camera equipment provided by the prior art is difficult to perform panoramic shooting is solved.

Figure 2:
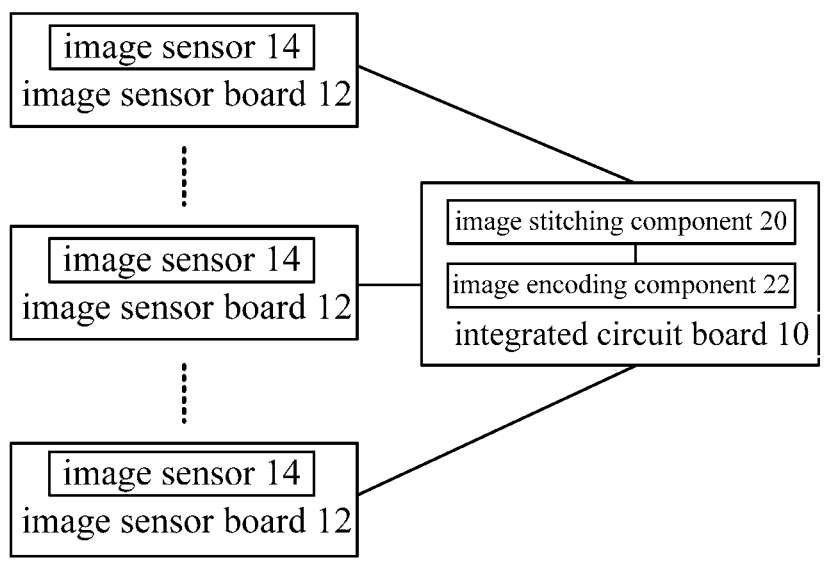
FIG. 2 is a first structural block diagram of a camera according to an optional embodiment of the present application.

FIG. 2 is a first structural block diagram of a camera according to an optional embodiment of the present application. As shown in FIG. 2, on the basis of the structural block diagram of the camera shown in FIG. 1, the integrated circuit board 10 described above further includes: an image stitching component 20 and an image encoding component 22 as specifically described below.

The image stitching component 20 is configured for outputting second image signals, which are obtained by performing stitching processing on the first image signals, to the image encoding component 22.

In this embodiment, the first image signals are image signals acquired by the image sensors 10, the second image signals are image signals processed by the image stitching component 20, and third image signals are image signals processed by the image encoding component 22. Specifically, the image stitching component 20 can be implemented with a Field-Programmable Gate Array (FPGA) chip. The FPGA chips with different specifications may be selected according to the strength of signals acquired by the image sensors 14. In a preferred embodiment, an FPGA chip of XC7A200T may be used, which can provide an overall image signal with a resolution of 4096*1800 after performing stitching processing for the image signals acquired by four IMX185 image sensors.

The image encoding component 22 is connected with the image stitching component 20 and configured for outputting third image signals which are obtained by encoding the second image signals.

Optionally, the encoding process in the image encoding component 22 includes performing such as analog-digital conversion, format conversion, and compression on the image signals subjected to the stitching processing. The image encoding component 22 can be implemented with a Digital Signal Processor (DSP). In this embodiment, the DSP is based on the AMBARELLA DSP platform, the clock rate of the dual core Cortex-A9 integrated therein is up to 1.1 GHz, which can implement encoding with 1080P, 120 frames. The description here is only for this specific embodiment, other platform's chips, such as a Hi3516A chip, can also be used to encode the images.

In an optional implementation according to this embodiment, the image encoding component 22 is further configured for sending a control signal to the image stitching component 20 and/or reading a current operation state of the image stitching component via Serial Peripheral Interfaces (SPIs), wherein the control signal is used for controlling or instructing the image stitching component 20 to perform stitching processing on the first image signals. The SPI supports full duplex communication, which further facilitates the information interaction between the image stitching component 20 and the image encoding component 22. However, the half duplex or simplex communication can be used between the image stitching component 20 and the image encoding component 22 in this embodiment.

In an optional implementation according to this embodiment, the image stitching component 20 is configured for outputting the second image signals to the image encoding component 22 via at least one pair of differential clock signal lines and twelve pairs of differential data signal lines.

In this embodiment, each of the image sensors sends the contents in acquired image signals to the image stitching component 20 (e.g. an FPGA chip) via four pairs of differential data signal lines, and at the same time, a pair of differential clock signal lines is needed to ensure that the image signals sent to the image stitching component 20 are synchronized in time, such that the connected four image sensors operate in synchronous mode. The image stitching component 20 implements seamless stitching processing on four image signals by processing the synchronized image signals from the four image sensors. The image stitching component 20 outputs at least one pair of differential clock signals and twelve pairs of differential data signals to the image encoding component 22 by using at least one pair of differential clock signal lines and twelve pairs of differential data signal lines. The differential clock signal lines are used for transmitting clock signals, and the differential data signal lines are used for transmitting data signals. Each pair of signal lines can include two transmission channels. In an optional example, for transmission of binary data signals, one of the two transmission channels of one pair of signal lines is used for transmitting the code "0" and the other is used for transmitting the code "1". The twelve pairs of differential data signals derive from 16 differential data signals acquired by the 4 image sensors, and at least one pair of differential clock signals derives from 4 pairs of clock signals of the image sensors. In a good communication environment, it only needs to transmit one clock signal; while in a poor communication environment, it needs to transmit two clock signals of main and standby clock signals, so as to ensure the receipt of the clock signal. In an optional example of this embodiment, the image stitching component 20 is connected with the image encoding component 22 via two pairs of differential clock signal lines and twelve pairs of differential data signal lines.

In an optional implementation of this embodiment, the image stitching component 20 in the camera according to this embodiment is further configured for configuring the image sensor 14 on each of the image sensor boards 12 and/or reading a current operation state of the image sensor 14 via serial peripheral interfaces. However, in this embodiment, interfaces in half duplex or simplex communication can be used to connect the image stitching component 20 and the image sensor boards 12.

Figure 3:
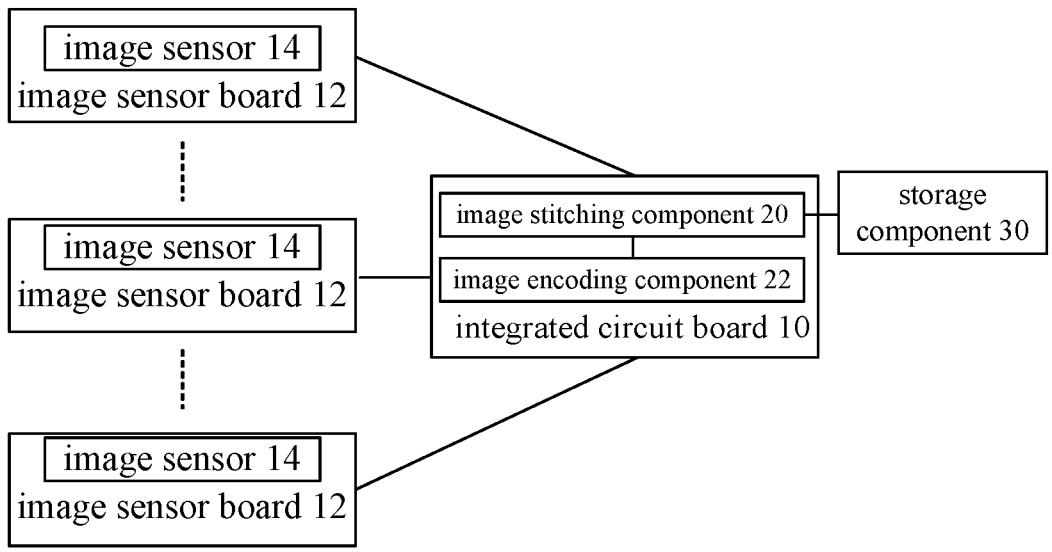
FIG. 3 is a second structural block diagram of a camera according to an optional embodiment of the present application.

FIG. 3 is a second structural block diagram of a camera according to an optional embodiment of the present application. As shown in FIG. 3, on the basis of components shown in FIG. 2, the camera can further include one or more storage components 30, which are connected with the integrated circuit board 10 and configured for storing first image signals.

In this embodiment, the camera can further include the storage component 30 for storing image signals input by the image sensors 14. Optionally, in an example of using four image sensors for acquiring the image signal, the storage component 30 can store image signals respectively. For example, one storage may be divided into four storage divisions for storing image signals acquired by the four image sensors 14 respectively. Also, 4 independent storage components 30 can be provided, each is connected with each of the image sensors 14 or connected with the image stitching component 20 in the integrated circuit board 10, and configured for storing image signals acquired by each of the image sensors 14 respectively. In a specific implementation, the image stitching component 20 is externally connected with 4 Double Data Rate synchronous dynamic random storages (DDRs for short), each with 16 bits wide and with a capacity of 1 GB.

In an optional implementation of this embodiment, the integrated circuit board 10 is connected with a plurality of image sensor boards 12 via board-to-board flexible connecting lines. In this optional implementation, the image sensor boards 12 mainly implement the acquiring of image signals. The signals transmitted via the flexible connecting lines include image signals, power and SPI communication signals, and other control signals. In a specific example, the image sensor boards 12 are connected with the integrated circuit board 10 via four 1.0-pitch and 30-bit board-to-board flexible connecting lines.

In an optional implementation of this embodiment, the shape of a photosensitive surface of an image sensor on each of the image sensor boards 12 is a rectangle, and short edges of the rectangle are parallel to the ground plane and long edges of the rectangle are perpendicular to the ground plane. Outer surfaces of the image sensors on the plurality of image sensor boards form a sector with a preset angle.

In this embodiment, each image sensor 14 is mounted on an image sensor board 12. The photosensitive surface of the surface of the image sensor 14 is a sheet with a rectangular shape, and short edges of the rectangle are parallel to the ground plane and long edges of the rectangle are perpendicular to the ground plane. Outer surfaces of the plurality of image sensors 14 form a sector. In a preferred implementation, the extension lines of the normal lines of the outer surfaces of the plurality of image sensors can intersect at a same point, such that the outer surfaces of the image sensors 14 form a sector with 180 degree or other angle. Each of the image sensors 14 are arranged at a regular interval along the curve of the sector. The angle of the sector can be adjusted according to the number of the image sensors 14. In a specific example, each of the sensors is mounted in such a way that the sensor is centered at the screen center and rotated by 90 degrees. 4 sensors are fixed on a single apparatus with their glass surfaces outward forming a sector with 180 degree.

Figure 4:
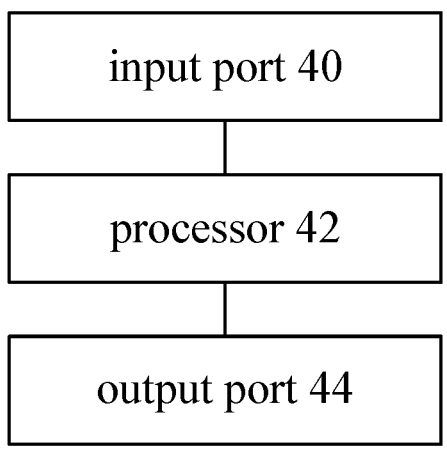
FIG. 4 is a structural block diagram of an integrated circuit board according to an optional embodiment of the present application.

FIG. 4 is a structural block diagram of an integrated circuit board according to an optional embodiment of the present application. The integrated circuit board can be applied in the camera described above, and can also be mounted and applied in other apparatus. As shown in FIG. 4, the integrated circuit board can include: an input port 40, a processor 42 and an output port 44 as described in detail below.

The input port 40 is connected with a plurality of image sensor boards and configured for receiving an image signal acquired by an image sensor mounted on each of the plurality of image sensor boards.

In this embodiment, one or more image sensors can be provided on each of the image sensor boards. The number of the image sensor boards described above is at least two. An illustrative example is provided, in which the processor is connected with 4 image sensor boards, and one image sensor is provided on each of the image sensor boards. This example is merely an optional implementation and is not construed as an inappropriate limitation to the present application. Other numbers of image sensor boards and image sensors can also solve the above technical problems and achieve the technical effect of the present application.

It should be noted that, in practice, the image sensor can be an IMX185 image sensor that is widely used in the industry, and the resolution of 1920*1200 can be provided by a single image sensor. Optionally, the image sensor boards are connected with the integrated circuit board via board-to-board flexible connecting lines, such as the board-to-board flexible with the standards of: a 1.0-pitch and 30-bit, which transmits image signals and other control signals.

The processor 42 is connected with the input port and configured for performing stitching and encoding processing on the image signals.

Optionally, the processor 42 can simultaneously perform stitching and encoding processing on the received image signals acquired by a plurality of image sensors, or firstly perform stitching processing and then encode the image signals, or firstly perform encode processing and then perform stitching processing on the image signals. In this embodiment, the stitching processing is firstly performed on image signals, and then the image signals subjected to the stitching processing are encoded.

The output port 44 is connected with the processor 42 and configured for outputting the image signals subjected to the stitching and encoding processing.

Optionally, the output port 44 can output the image signals processed by the processor 42 to an external display apparatus, a server or the like, by specifically reserving wires for ports, such as alarm inputs and outputs, audio inputs and outputs, 485-interfaces as well as power and network interfaces.

In an optional implementation according to this embodiment, the input port 40 is configured for receiving image signals via a pair of differential clock signal lines and a plurality pairs of differential data signal lines.

Optionally, in this embodiment, the number of the image sensor boards is 4. An image sensor transmits acquired image signals via a pair of differential clock signal lines and 4 pairs of differential data signal lines. The differential clock signal lines are used for ensuring that the image signals output by different image sensors are synchronized in time, and the differential data signal lines are used for transmitting the contents in the image signals.

Optionally, in this embodiment, one image sensor is mounted on each of the image sensor boards. Optionally, in addition to the image sensor, each of the image sensor boards can further include, but not limited to, the following components (not shown in the figure): a power circuit and a socket.

Optionally, in addition to the input port 40, the processor 42 and the output port 44 described above, the integrated circuit board can further include, but not limited to, the following components (not shown in the figure): a power supply component (such as, a power supply for the integrated circuit board), a power interface circuit, a power conversion circuit. The power supply component can be powered by a Power over Ethernet (POE) component. The power interface can be a DC or an AC interface circuit, such as an AC24 or DC12V interface circuit.

Figure 5:
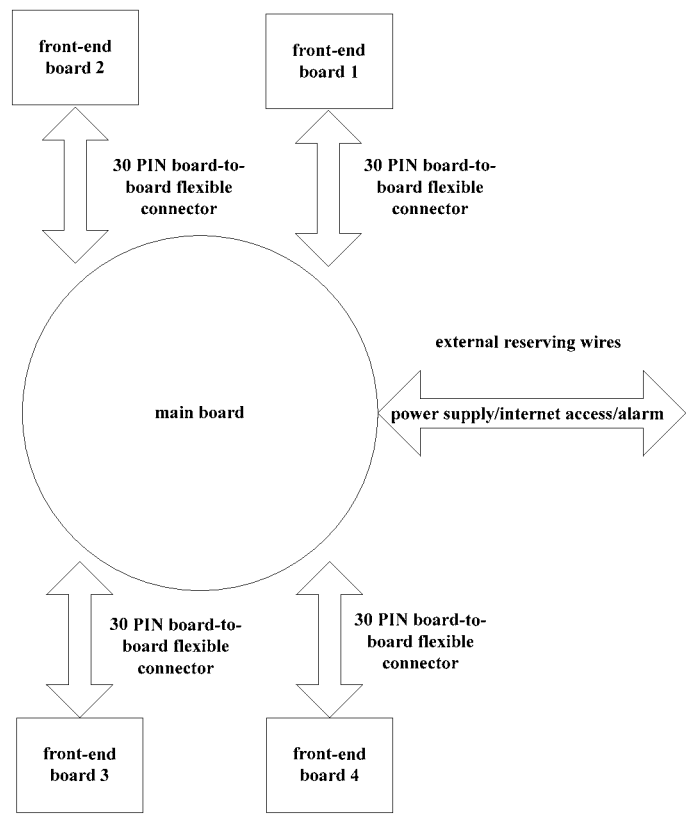
FIG. 5 is a schematic diagram of the internal structure of a camera according to an optional embodiment of the present application.

The present application is specifically described below with reference to an optional embodiment. FIG. 5 is a schematic diagram of the internal structure of a camera according to an optional embodiment of the present application. As shown in FIG. 5, the camera can include: a main board (equivalent to the integrated circuit board in the above embodiment), front-end boards (equivalent to the image sensor boards in the above embodiment), and connecting components. The modules in hardware implementation of the camera in this embodiment involve the following portions.

For acquiring and outputting of images by image sensors, simultaneous access to four image sensors is supported. The image sensors can be IMX185 image sensors widely used in the industry. The resolution of 1920*1200 can be provided by one single image sensor, the resolution of 4096*1800 can be provided by stitching the images from the four sensors. With respect to the access processing for four-path images, the FPGA chip XC7A200T is employed, 4 DDRs, each with 16 bits of a bit wide and 1 GB of the capacity, are connected externally. The DSP is based on the AMBARELLA DSP platform, the clock rate of the dual core Cortex-A9 internally integrated is up to 1.1 GHz, which can implement encoding at 1080P at 120 frames per second. There are two schemes of the chip for processing the images: one is AMBARELLA DSP88, the other is Hi3516A.

The camera of this embodiment is connected with 4 sensors. However, An FPGA in larger package can be used to connect with more sensors.

The hardware is composed of a main board and 4 front-end boards. FIG. 5 is a structural block diagram of an optional embodiment. As shown in FIG. 5, the main board of this embodiment includes an FPGA module circuit, a DSP module circuit, as well as a POE and an AC24, a DC12V interface circuit, a system power conversion circuit. There are four front-end boards and each includes an image sensor module, a power supply circuit and an ICR socket. The front-end boards are connected with the main board via four 1.0-pitch and 30-bit board-to-board flexible connecting lines. The main board reserves wires for external interfaces, such as alarm inputs and outputs, audio inputs and outputs, 485-interfaces as well as power and network interfaces.

Figure 6:
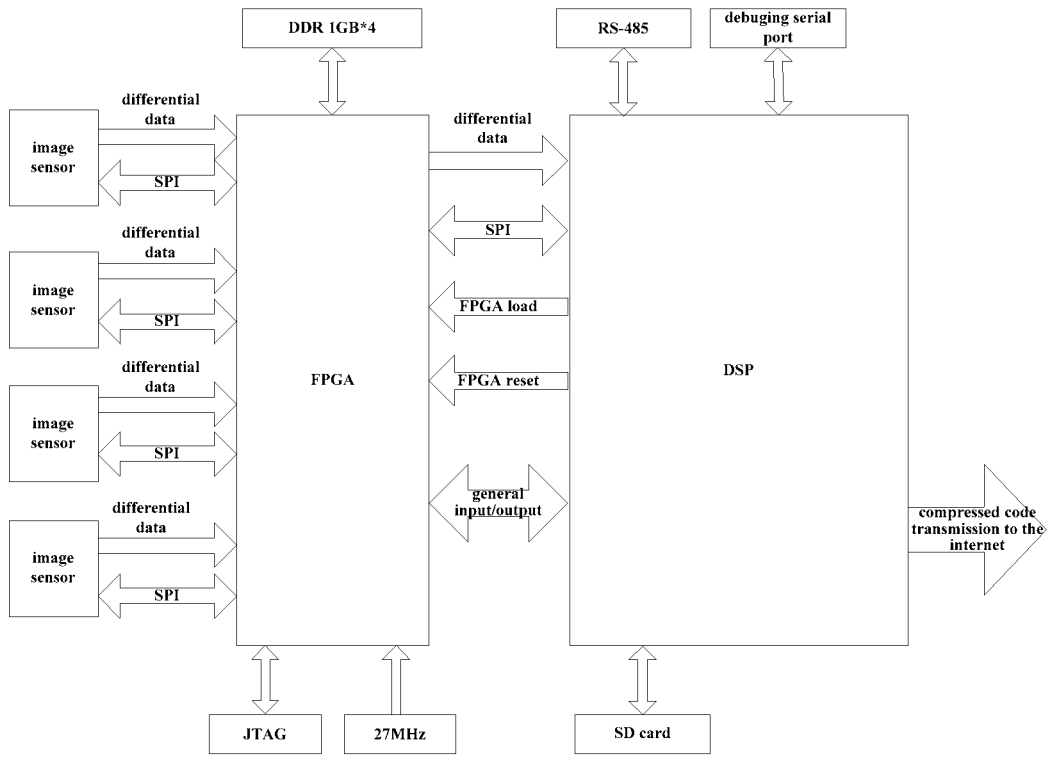
FIG. 6 is a schematic diagram for performing stitching and encoding processing on an image signal according to an optional embodiment of the present application.

FIG. 6 is a schematic diagram for performing stitching and encoding processing on an image signal according to an optional embodiment of the present application. As shown in FIG. 6, the main board accesses to four image sensors by XC7A200T chip. Each of the sensors is connected with the FPGA chip via four pairs of differential data signal lines and a pair of differential clock signal lines. The XC7A200T is mainly used to ensure that the four accessed image sensors operate in synchronous mode. The FPGA is connected with image interfaces of the DSP main chip via twelve pairs of differential data signal lines and 2 pairs of differential clock signal lines.

The DSP module is mainly used for encoding front-end image signals and controlling peripherals. The DSP module communicates with the FPGA via an SPI, and an I2C is reserved for communication for configuring the sensors. The DSP module communicates with a microcontroller via the I2C. The system uses an STM8 microcontroller and heating logic to control a heating module and a fan in order to achieve the function of the heating module. The main board can be powered by POE and a DC12V power supply, the function of being powered by an AC24V power supply is optional. The 12V power is converted to 5V power by a DCDC chip, and then the 5V power is converted to appropriate power required by other modules.

The front-end boards mainly implement the acquiring of image signals. The front-end boards are connected with the main board via 1.0-pitch and 30-bit board-to-board flexible connecting lines, in order to implement transmission of the image signals, SPI communication signals and other control signals, and to provide power.

Each of the sensors is mounted on a sensor circuit board. The sensor is a sheet with a rectangular shape. Each of the sensors is mounted in such a way that the sensor is rotated by 90 degrees taking the screen center as the origin point, and its short edges are parallel to the ground plane and long edges are perpendicular to the ground plane. The 4 sensors are fixed on a single apparatus with their glass surfaces outward forming a sector with 180 degree.

Each of the sensors is connected with each other via 1.0 pitch and 30-bit board-to-board flexible connecting lines. Each of the sensors is connected with the FPGA chip via 4 pairs of differential data signal lines and 1 pair of differential clock signal lines. In addition, the FPGA can configure the sensors via SPIs.

The FPGA is connected with DDR chips via wires inside the board. The FPGA is further connected with test components, such as a Joint Test Action Group (JTAG for short), for joint testing for FPGA.

The FPGA is connected with an image processing chip via wires inside the board. The FPGA outputs the stitched images to the image processing chip via a set of image data interfaces. The FPGA interacts with the image processing chip to exchange control information via a set of SPIs.

The serial numbers of the above embodiments of the present application, if any, are merely for description and do not indicate that one embodiment is better than another.

For the description of each of the embodiments of the present application, the emphasis is laid on a particular aspect. For the parts that are not described in detail in a certain embodiment, references can be made to the related description of other embodiments.

It should be understood that in the embodiments herein, the disclosed technical solution can be implemented in other ways. The apparatus embodiments described above are merely illustrative. For example, the apparatus can be divided into units according to the logical functions, however, in practice, the apparatus can be divided in other ways. For example, a plurality of units or components can be combined or integrated into another system, or some features can be ignored or not executed. Further, the coupling or direct coupling or communication connections between each other shown or discussed above can be indirect coupling or communication connections via the interfaces, units or modules, which can be electrical connections or other forms of connections.

The units illustrated as separate components may or may not be physically separated. The components shown as units may or may not be physical units, and can be located on one unit or can be distributed on a plurality of units. Some or all of the units can be selected according to actual needs to achieve the objective of the solution of the present embodiments.

In addition, all the functional units in the embodiments of the present application can be integrated in one processing unit, or each of the units can be an individual unit, or two or more units can be integrated in one unit. The integrated unit described above can be implemented as hardware or can be implemented as a software function unit.

When the integrated unit is implemented as a software function unit and is sold or used as an independent product, the integrated unit can be stored in a computer readable storage medium. On the basis of the understanding above, the essential technical solution of the present application, or the part contributing to the prior art, or all or a part of the technical solution can be implemented as a software product. The computer software product is stored in a storage medium, including instructions to make a computer device (such as, a personal computer, a server or network equipment) perform all or some of the steps of the method of each embodiment of the present application. The storage medium includes medium capable of storing program code, such as a USB flash disk, a Read Only Memory (ROM), a Random Access Memory (RAM), a mobile hard disk, a magnetic disk, or an optical disk.

The implementations are merely preferred implementations of the present application. It should be noted that those of ordinary skills in the art can make improvements and modifications without departing from the principle of the present application, and these improvements and modifications should be considered within the protection scope of the present application.

The invention claimed is:

1. A camera, comprising: an integrated circuit board, and a plurality of image sensor boards, wherein each of the image sensor boards has an image sensor mounted thereon;
   the plurality of image sensor boards are to output acquired first image signals to the integrated circuit board; and
   the integrated circuit board is connected with the plurality of image sensor boards and to perform stitching and encoding processing on the first image signals;
   wherein the integrated circuit board comprises:
   an image stitching circuit, that outputs second image signals, which are obtained by performing stitching processing on the first image signals, to an image encoding circuit; and
   the image encoding circuit connected with the image stitching circuit and to output third image signals which are obtained by performing encoding processing on the second image signals;
   wherein the image stitching circuit configures the image sensor on each of the image sensor boards and/or reading a current operation state of the image sensor via serial peripheral interfaces, so as to cause a plurality of image sensors to be operated in a synchronous mode and to acquire synchronized image signals;
   wherein the image sensors, the image stitching circuit and the image encoding circuit transmit image signals between each other via at least one pair of differential clock signal lines and a plurality of pairs of differential data signal lines.

2. The camera of claim 1, wherein the image encoding circuit is further to send a control signal to the image stitching circuit and/or read a current operation state of the image stitching circuit via serial peripheral interfaces.

3. The camera of claim 1, wherein the camera further comprises one or more storage components connected with the integrated circuit board and configured for storing the first image signals.

4. The camera of claim 1, wherein the integrated circuit board is connected with the plurality of image sensor boards via flexible connecting lines.

5. The camera of claim 1, wherein the shape of a photosensitive surface of an image sensor on each of the image sensor boards is a rectangle, short edges of the rectangle are parallel to the ground plane and long edges of the rectangle are perpendicular to the ground plane, and outer surfaces of the image sensors on the plurality of image sensor boards form a sector with a preset angle.

6. An integrated circuit board, comprising:
- an input port, connected with a plurality of image sensor boards to receive an image signal acquired by an image sensor mounted on each of the plurality of image sensor boards;
- a processor, connected with the input port to perform stitching and encoding processing on the image signals; and
- an output port, connected with the processor to output image signals subjected to the stitching and encoding processing;
- wherein the integrated circuit board further comprises:
- an FPGA circuit to perform stitching processing on the image signals;
- a DSP circuit, for performing encoding processing on the image signals;
- wherein, the FPGA circuit configures the image sensor on each of the plurality of the image sensor boards via serial peripheral interfaces, so as to cause a plurality of image sensors to be operated in a synchronous mode and to acquire synchronized image signals;
- wherein the image sensors, the FPGA circuit and the DSP circuit transmit image signals between each other via at least one pair of differential clock signal lines and a plurality of pairs of differential data signal lines.

* * * * *